United States Patent [19]

Ohi et al.

[11] Patent Number: 5,768,749
[45] Date of Patent: Jun. 23, 1998

[54] PORTABLE AIR BLOWER

[75] Inventors: Taku Ohi, Chandler; Kenneth M. Brazell, Phoenix; Naoki Kikuchi, Chandler, all of Ariz.

[73] Assignee: Ryobi North America, Inc., Easley, S.C.

[21] Appl. No.: 690,366

[22] Filed: Jul. 26, 1996

[51] Int. Cl.⁶ ................................................ A47L 5/14
[52] U.S. Cl. ................................ 15/405; 15/328; 15/344; 15/415.1
[58] Field of Search .............................. 15/405, 344, 328, 15/415.1

[56] References Cited

U.S. PATENT DOCUMENTS

| | | | |
|---|---|---|---|
| D. 258,909 | 4/1981 | Satoh . | |
| D. 297,274 | 8/1988 | Komiya et al. . | |
| 4,187,577 | 2/1980 | Hansen et al. . | |
| 4,227,280 | 10/1980 | Comer | 15/405 X |
| 4,237,576 | 12/1980 | Stakes | 15/405 X |
| 4,242,794 | 1/1981 | Peterson . | |
| 4,404,706 | 9/1983 | Loyd | 15/9 |
| 4,413,371 | 11/1983 | Tuggle et al. | 15/405 |
| 4,573,237 | 3/1986 | Kochte et al. | 15/414 X |
| 4,674,146 | 6/1987 | Tuggle et al. | 15/405 X |
| 4,694,528 | 9/1987 | Comer et al. | 15/405 X |
| 5,584,436 | 12/1996 | Sepke | 15/414 X |

Primary Examiner—Chris K. Moore
Attorney, Agent, or Firm—Brooks & Kushman P.C.

[57] ABSTRACT

A blower is provided having a plurality of tubular nozzles removably attachable to the blower enabling an operator to easily vary the velocity and air discharge pattern. The blower forms part of an operator carried power tool having a drive motor spaced from the blower assembly by a tubular boom containing a drive shaft. The blower comprises a blower housing having an axial air inlet and an air outlet defined by a tubular section. An impeller is pivotally mounted within the blower housing and driven by the drive shaft. As the impeller is rotated, air is drawn through the air inlet and discharged through one of a plurality of tubular nozzles mounted on the blower housing tubular section. Tubular nozzles have varying geometries to conveniently vary the discharge air pattern.

9 Claims, 3 Drawing Sheets

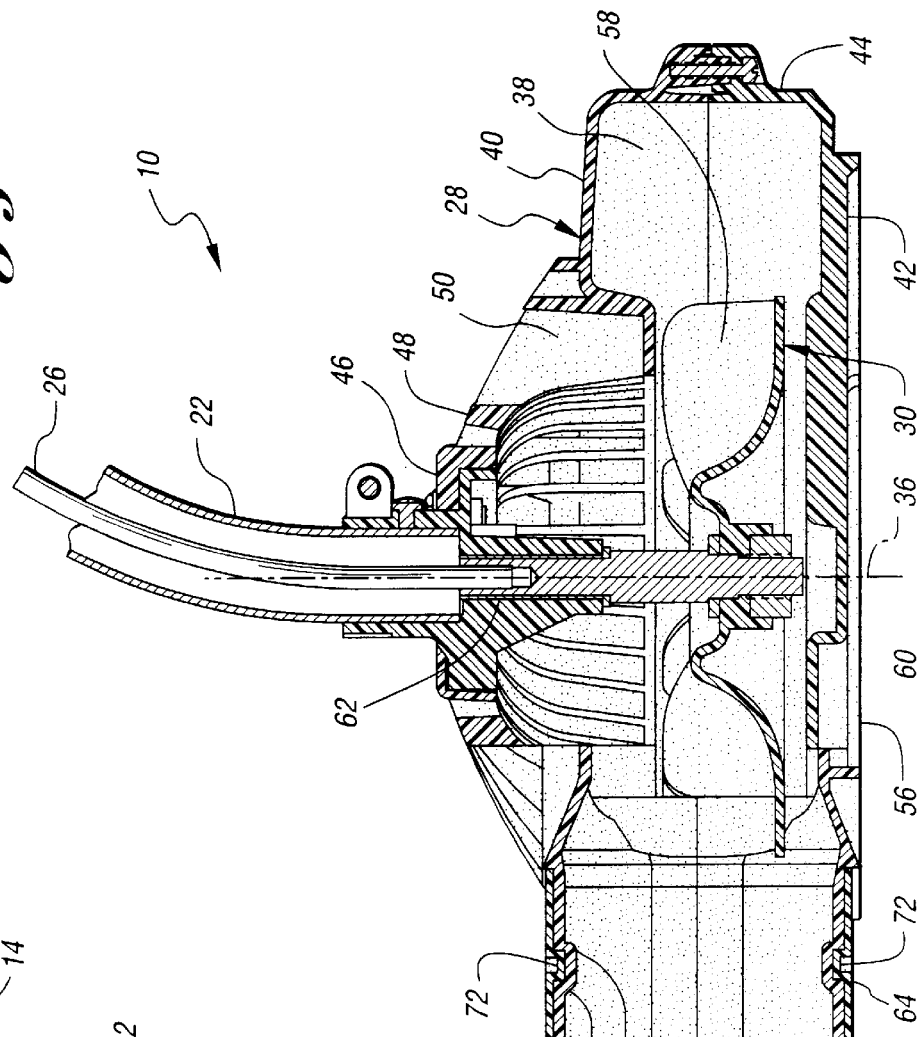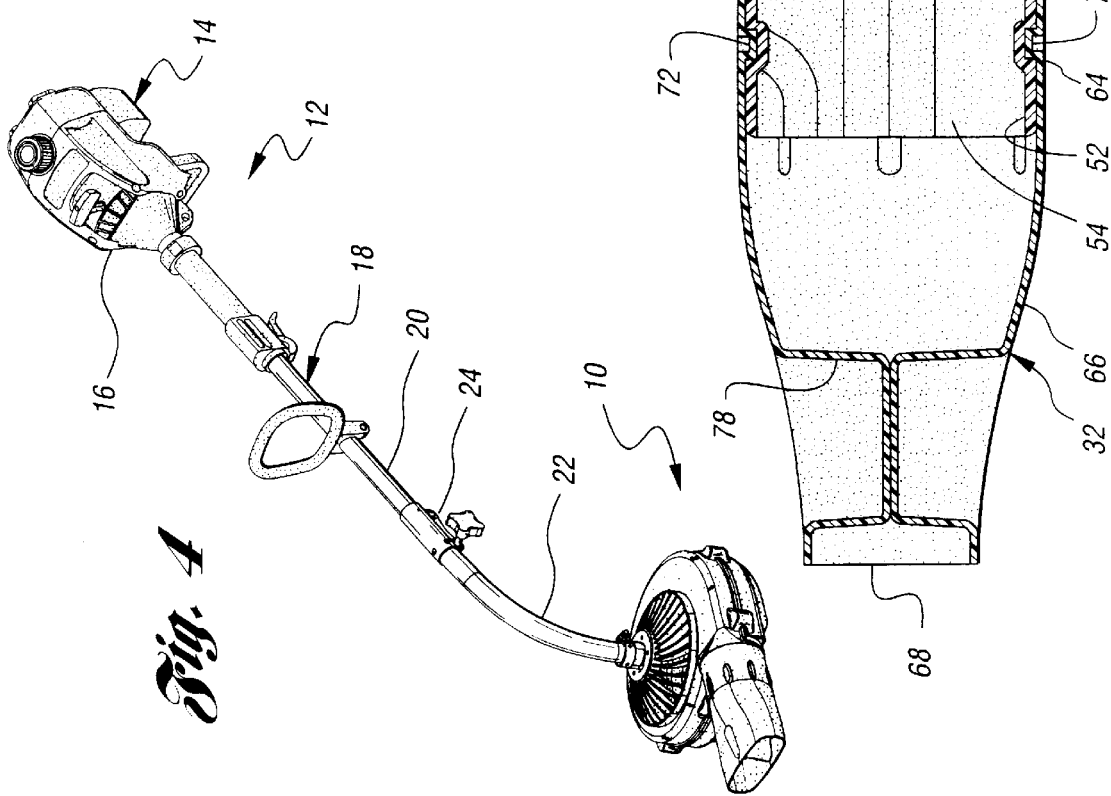

PORTABLE AIR BLOWER

TECHNICAL FIELD

This invention relates generally to air blowers used with operator carried power tools, and more specifically to air blowers mounted on the end of an elongated tubular boom containing a drive shaft, operatively driven by a motor assembly oriented on the opposite end of the tubular boom as the air blower.

BACKGROUND ART

Portable air blowers are commonly used in outdoor yards and gardens to sweep up leaves and other debris. Portable air blowers are currently available in a number of mechanical configurations ranging from backpack mounted engine/blower assemblies having an air discharge wand as used by commercial lawn services to a simple add-on blower attachment connectable to a line trimmer head. The two most common types of portable air blowers are the unitary motor/blower type shown in U.S. Pat. No. 4,644,606 and the elongated boom type blower as shown in U.S. Pat. No. 4,404,706. Elongated boom type blowers have a blower unit mounted on one end of a boom and a motor on the opposite end of the boom, with a drive shaft extending through the boom operatively connecting the motor to the blower impeller.

Boom type blowers are traditionally provided with an injection molded plastic blower housing having an integrally formed axial air inlet and a generally circumferential air outlet perpendicular to the impeller rotation. The discharged air pattern is dictated by the geometry of the air outlet formed in the blower housing. The unitary motor/blower units are provided with removable blower outlet tubes and in some instances, removable nozzle sections mounted on the elongated end of the blower tube in order to vary the air discharge pattern.

SUMMARY OF THE INVENTION

Accordingly, an air blower of the present invention is provided for use with an operator carried power tool having a drive motor with an elongated boom extended therefrom, the boom having an internal rotatable drive shaft. The blower is provided with a housing which is affixed to the boom opposite the motor, the housing having a central axis with an axial air inlet and an air outlet formed by a tubular section on the blower housing circumferential wall. The impeller is pivotally mounted to the housing and connected to the drive motor by the drive shaft causing air to enter the blower housing through the air inlet and be discharged at high speed through the air outlet. A plurality of tubular nozzles, each removably attachable to the tubular section of the blower housing may be selectively installed by the user in order to vary the velocity and discharge pattern of the discharged air. Each of the tubular nozzles is provided with a tubular connector section for engagement with the tubular section of the blower housing, a tubular body, and a discharge outlet for controlling the pattern and velocity of the discharged air.

It is therefore an object of the present invention to provide a portable air blower which is driven by a motorized power tool having an elongated boom, with an internal drive shaft, where the user may vary the air discharge pattern and air velocity conveniently to suit the particular type of debris to be collected.

It is a further object of the present invention to provide a portable operator carriable air blower which is ergonomically acceptable and convenient to use by a wide cross-section of the consuming public.

It is still a further object of the present invention to provide a convenient and low cost way for the user of a portable air blower to vary the discharge pattern and velocity of the air outlet.

Other objects, features, aspects and embodiments of the present invention will be readily apparent from the following detailed description of the preferred embodiment.

BRIEF DESCRIPTION OF THE DRAWINGS

FIG. 1a is an alternative tubular nozzle which may be used with the blower of FIG. 1;

FIG. 3 is a cross-sectional side elevation taken along line 3—3 of FIG. 2; and

FIG. 4 is a perspective view of the blower mounted on an operator carried power tool.

BEST MODE FOR CARRYING OUT THE INVENTION

Figure 1:
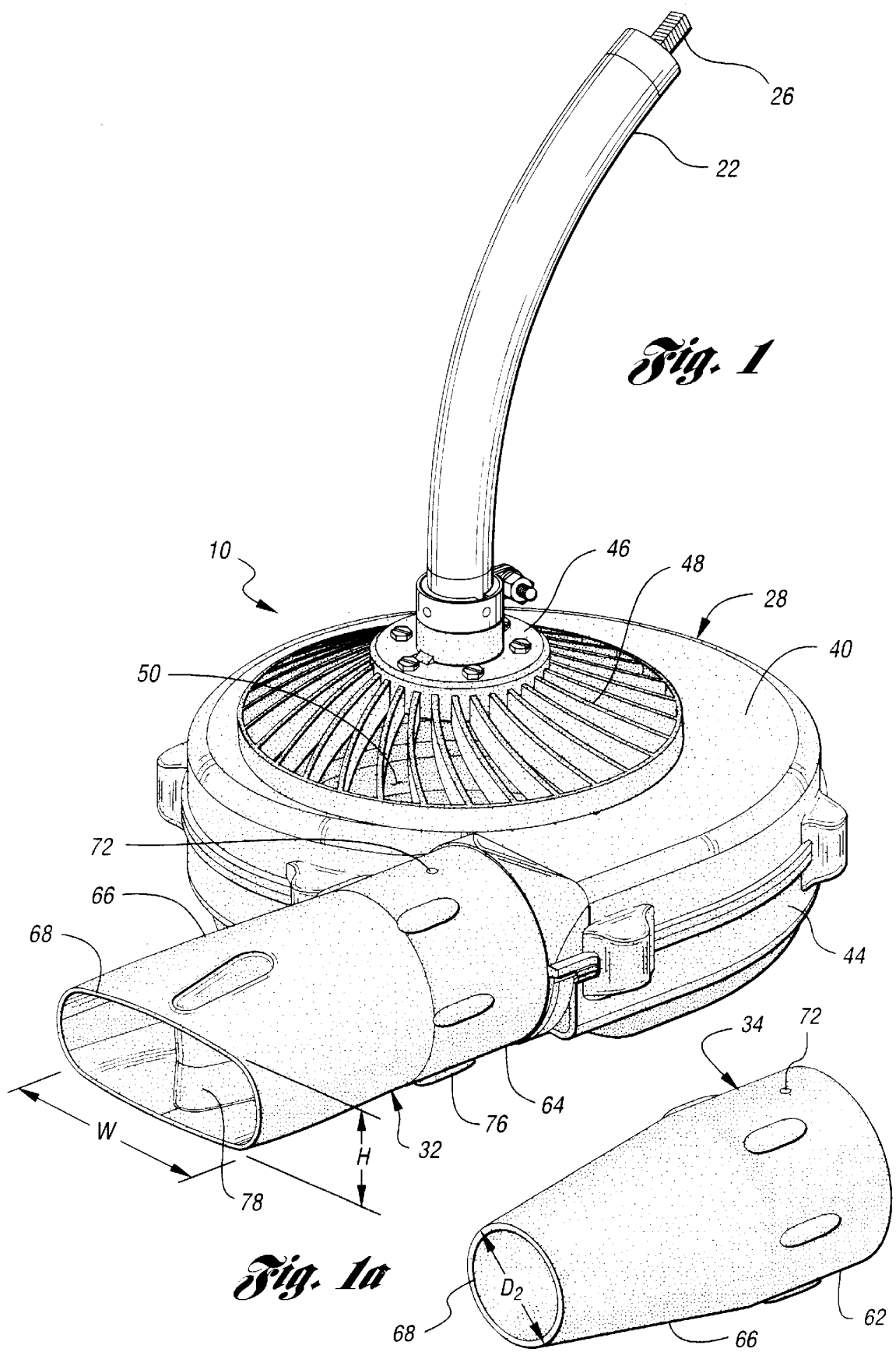
FIG. 1 is a perspective view of a the blower according to the present invention.

Referring to FIGS. 1–4, the blower system of the present invention is generally indicated by reference number 10. The blower system 10 is shown in FIG. 4 connected to an operator carried power tool 12 having a drive motor 14 with a motor housing 16. A elongated tubular boom 18 extends between motor housing 16 and blower system 10. In the preferred embodiment illustrated, boom 18 is made up of two segments, an upper segment 20 associated with the motor housing 16 and a lower segment 22 associated with blower system 10. A coupling 24 affixes the upper segment 20 to lower segment 22 enabling the operator to removably exchange blower system 10 with a different type of implement such as a line trimmer or an edger. A drive shaft 26 extends through the boom 18 operatively connecting the drive motor 14 to blower system 10 in the preferred embodiment illustrated.

Figure 2:
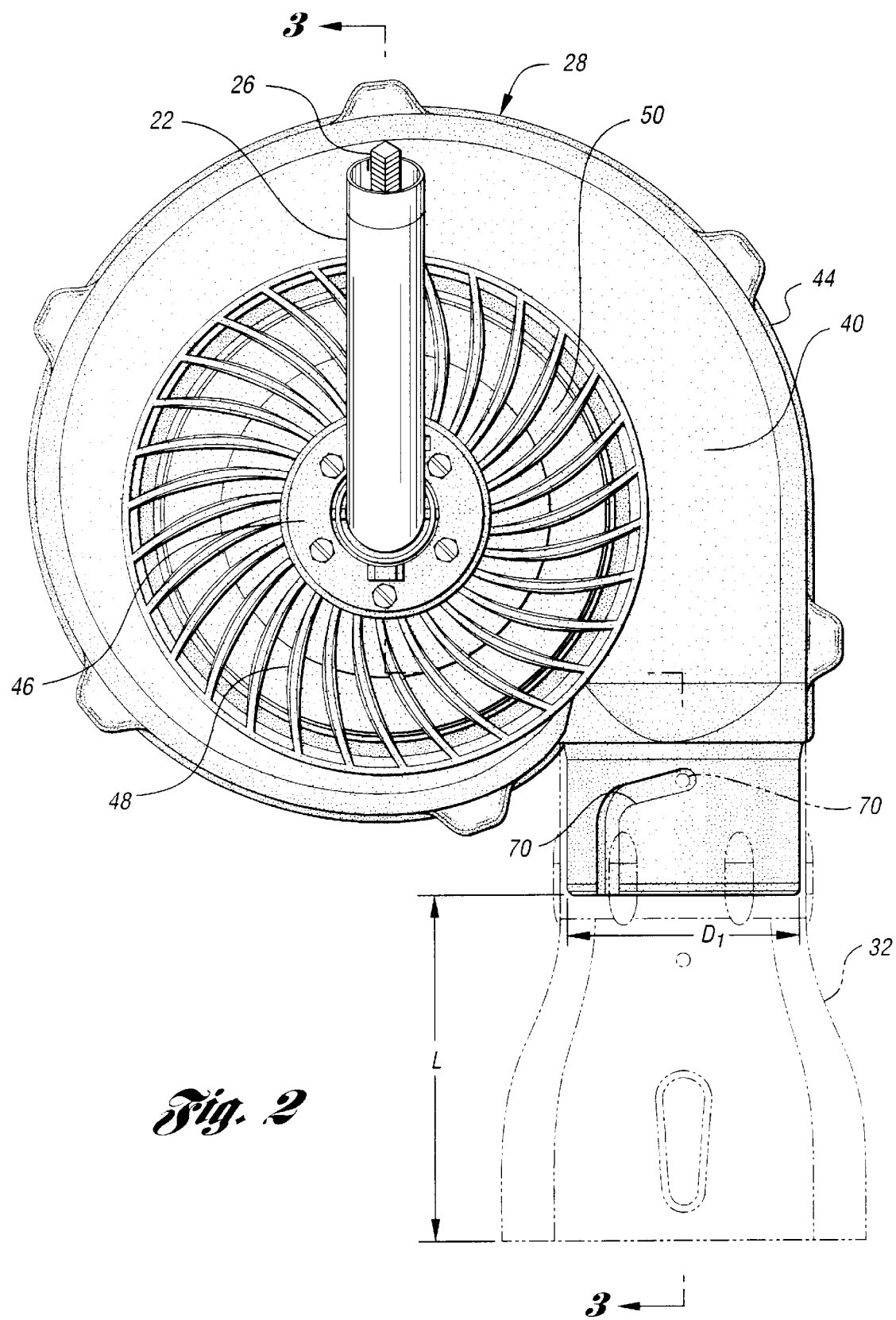
FIG. 2 is a top plan view of the blower with the tubular nozzle shown in phantom outline.

As illustrated in FIGS. 1–2, a drive shaft 26 will be made of two segments, an upper segment associated with an operator carrying power tool drive unit and a lower segment associated with the blower system 10. The upper and lower drive shaft segments are joined using a conventional telescopic connector (not shown) in the region of coupling 24.

Blower system 10 is made up of three major components, a blower housing 28, a impeller 30 and a plurality of tubular nozzles, one nozzle 32 shown in FIG. 1 and another nozzle 34 shown in FIG. 1a. As illustrated in the cross-sectional view of FIG. 3, blower housing 28 is provided with a central axis 36 and internal cavity 38 bounded by top wall 40 and bottom wall 42 and circumferential wall 44. Top wall 40 has a central hub 46 formed therein oriented (or aligned) concentrically with central axis 36 and serving to mount boom lower segment 22 to blower housing 28. Spaced about hub 46 and extending between hub 46 and top wall 40 are a series of ribs 48 collectively defining therebetween an air inlet 50 which allows air to enter into internal cavity 38. Circumferential wall 44 is provided with a tubular section 52 which defines an air outlet 54 through which air may exit internal cavity 38. As can be seen in the FIG. 2 plan view, circumferential wall 44 has a varying radius defining a volute shape internal cavity oriented about central axis 36.

Referring again to FIG. 3, impeller 30 is oriented within internal cavity 38 concentric with central axis 36 and pivotably rotatable relative to blower housing 28. Rotation of the impeller 30 relative to the blower housing 28 causes air to enter air inlet 50 and be discharged through air outlet 54. Impeller 30 is made up of centrifugal fan 56 having a plurality of blades 58 which extend outwardly about central axis 36. Fan 56 is mounted upon an impeller shaft 60 pivotally supported relative to hub 46 by bearing 62. Impeller shaft 60 is connected to the lower segment of blower drive shaft 26 as illustrated in FIG. 3 to enable drive motor 14 to rotate impeller 30 about a central axis 36.

Blower system 10 is provided with a plurality of tubular nozzles illustrated by nozzle 32 and nozzle 34 as shown in FIGS. 1 and 1a, respectively. It should be appreciated that numerous other nozzle configurations could be utilized in order to vary the air discharge pattern and air discharge velocity. Each of the plurality of tubular nozzles will have a tubular connector section 64 for releasable engagement with the tubular section 52 of blower housing 28. Each of the tubular nozzles will be further provided with a tubular body section 66 which terminates into discharge outlet 68. The tubular body section 66 is preferably as short as possible to achieve to a smooth transition between the circular tubular section 52 having a diameter $D_1$, illustrated in FIG. 2, and the discharge outlet 68 having a geometry which will vary depending upon the desired discharge and velocity and discharge air pattern.

Again referring to FIG. 2, preferably, the tubular body section 66 of the tubular nozzles will have a length L which projects beyond the tubular section 52, where L is greater than $D_1$ and less than three times $D_1$. Having a length L shorter than the $D_1$ will not be sufficiently long to enable a smooth transition between the circular tubular section 52 and a discharge outlet 68 having a pronouncedly different size and shape. Having a length L greater than three times $D_1$ becomes inefficient and unnecessary to achieve a minimal pressure drop transition in cross-sectional configuration.

In order to ensure that the tubular nozzles remain securely mounted on blower housing 28, tubular nozzle connector section 64 and the corresponding tubular section 52 of the blower housing 28 are provided with cooperating bayonet-type fasteners. In the preferred embodiment illustrated in FIG. 2, the bayonet-type fasteners are made up of a J-shaped female slot 70 formed on tubular section 52 and a radially inwardly extending male projection 72 formed on the tubular connector section 64 of tubular nozzles 32 and 34.

Preferably, in order to enhance the user's grip upon the tubular nozzle when installing or moving the tubular nozzle from blower housing 28, tubular connector portion 64 is provided with a plurality of circumferentially spaced apart raised bumps 76, illustrated in FIG. 1. Both the nozzles 32 and 34 are preferably formed of plastic utilizing a blow molding process. Ideally, the nozzles are formed of high density polyethylene material resulting in a nozzle which is very strong, relatively inexpensive and abrasion resistant.

Nozzle 32 has a large oval discharge outlet 68 having a vertical height H of approximately 120 mm and a horizontal width W of approximately 45 mm. In order to successfully discharge air throughout the entire width of discharge outlet 68, a vertical column 78 is formed centrally within the tubular body portion 66 of nozzle 32, bisecting the outlet 68. This causes the discharge pattern to fan out within a very short nozzle length L.

Nozzle 34 illustrated in FIG. 1a has a generally circular discharge outlet 68 having a diameter of $D_2$. Preferably, $D_2$ is 0.4 to 0.7 times the $D_1$ resulting in a discharge air stream which is concentrated into a high speed jet pattern. In the embodiment illustrated, $D_1$ is approximately 80 mm and $D_2$ is approximately 50 mm. The tubular body portion 66 of nozzle 34 is generally of a frustoconical shape as illustrated.

While the best mode for carrying out the invention has been described in detail, those familiar with the art to which this invention relates will recognize various alternative designs and embodiments for practicing the invention as defined by the following claims.

What is claimed is:

1. A blower system for use with an operator carried power tool having a drive motor with a motor housing and rotary output, an elongated tubular boom extending between the motor housing and the blower, and a drive shaft oriented within the tubular boom coupling the drive motor rotary output to the blower, the blower comprising:

a blower housing having a central axis and an internal cavity bounded by a top wall, a bottom wall and a circumferential wall, the top wall having a hub formed therein aligned with the central axis and an air inlet extending through the top wall allowing air to enter the internal cavity, the circumferential wall having a tubular section formed therein defining an air outlet for air to exit from the internal cavity;

an impeller oriented within the internal cavity of the blower housing and pivotally mounted thereto for rotation about the central axis, the rotation of the impeller relative to the blower housing causing air to enter the internal cavity of the blower housing through the air inlet and be discharged through the air outlet; and a plurality of tubular nozzles each removably attachable to the tubular section of the blower housing, each of the tubular nozzles having a tubular connector for engagement with the tubular section of the blower housing, a tubular body providing an air passageway, and a discharge outlet for controlling the velocity and pattern of the discharged air, wherein the operator of the power tool can easily vary the air discharge pattern as a result of installing a selected one of the plurality of tubular nozzles on the tubular section of the blower housing.

2. The blower system of claim 1 wherein the tubular section of the blower housing and the associated tubular connector of each of the plurality of tubular nozzles are provided with corresponding male and female bayonet type connectors.

3. The blower system of claim 1 wherein the discharge outlet of at least one of the plurality of tubular nozzles has a horizontal width and a vertical height, the width being at least twice the height to form a fan shape air discharge pattern.

4. The blower system of claim 1 wherein each of the tubular nozzles has a diameter $D_1$ at the tubular connector and an overall length L, wherein L is greater than $D_1$ and less than 3 times $D_1$.

5. The blower system of claim 1 wherein each of the plurality of tubular nozzles are made of a thermoplastic material and formed by a blow molding process.

6. The blower system of claim 1 wherein the discharge outlet of at least one of the plurality of tubular nozzles is generally circular and the tubular body is frustoconical, converging in the direction of discharged air flow.

7. The blower system of claim 6 wherein the at least one of the plurality of tubular nozzles has a diameter $D_1$ adjacent the tubular connector and a diameter $D_2$ adjacent the discharge outlet wherein $D_2$ is 0.4 to 0.7 times $D_1$, resulting in the discharge air being concentrated into a high speed jet pattern.

8. A blower for use with an operator carried power tool having a drive motor with a motor housing and rotary output, an elongated tubular boom extending between the motor housing and the blower, and a drive shaft oriented within the tubular boom coupling the drive motor rotary output to the blower, the blower comprising:

a blower housing having a central axis and an internal cavity bounded by a top wall, a bottom wall and a circumferential wall, the top wall having a hub formed therein aligned with the central axis and an air inlet extending through the top wall allowing air to enter the internal cavity, the circumferential wall having a tubular section formed therein defining an air outlet for air to exit from the internal cavity;

an impeller oriented within the internal cavity of the blower housing and pivotally mounted thereto for rotation about the central axis, the rotation of the impeller relative to the blower housing causing air to enter the internal cavity of the blower housing through the air inlet and be discharged through the air outlet;

at least one tubular nozzle removably attachable to the tubular section of the blower housing, the at least one tubular nozzle having a tubular connector for engagement with the tubular section of the blower housing, a tubular body providing an air passageway, and a discharge outlet for controlling the velocity and pattern of the discharged air; and wherein the tubular section of the at least one tubular nozzle is further provided with a plurality of raised bumps circumferentially spaced thereabout to provide a grip for a user seeking to change the tubular nozzle.

9. A blower for use with an operator carried power tool having a drive motor with a motor housing and rotary output, an elongated tubular boom extending between the motor housing and the blower, and a drive shaft oriented within the tubular boom coupling the drive motor rotary output to the blower, the blower comprising:

a blower housing having a central axis and an internal cavity bounded by a top wall, a bottom wall and a circumferential wall, the top wall having a hub formed therein aligned with the central axis and an air inlet extending through the top wall allowing air to enter the internal cavity, the circumferential wall having a tubular section formed therein defining an air outlet for air to exit from the internal cavity;

an impeller oriented within the internal cavity of the blower housing and pivotally mounted thereto for rotation about the central axis, the rotation of the impeller relative to the blower housing causing air to enter the internal cavity of the blower housing through the air inlet and be discharged through the air outlet;

at least one tubular nozzle removably attachable to the tubular section of the blower housing, the at least one tubular nozzle having a tubular connector for engagement with the tubular section of the blower housing, a tubular body providing an air passageway, and a discharge outlet for controlling the velocity and pattern of the discharged air;

wherein the discharge outlet of the at least one tubular nozzle has a horizontal width and a vertical height, the width being at least twice the height to form a fan shape air discharge pattern; and wherein the at least one tubular nozzle is further provided with a vertical column bisecting the air discharge outlet, the vertical column providing structural rigidity to the discharge outlet and causing the discharged air the horizontally fan out.

* * * * *